(12) United States Patent
Kurosaki et al.

(10) Patent No.: US 8,366,278 B2
(45) Date of Patent: Feb. 5, 2013

(54) LIGHT SOURCE DEVICE AND PROJECTOR

(75) Inventors: Hideyuki Kurosaki, Tachikawa (JP);
Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 268 days.

(21) Appl. No.: 12/773,163

(22) Filed: May 4, 2010

(65) Prior Publication Data

US 2010/0328632 A1 Dec. 30, 2010

(30) Foreign Application Priority Data

Jun. 30, 2009 (JP) ................ P2009-155434

(51) Int. Cl.
*G03B 21/28* (2006.01)
*G01J 1/58* (2006.01)

(52) U.S. Cl. .................... 353/98; 250/486.1
(58) Field of Classification Search ............... 250/483.1, 250/484.2, 486.1; 353/98, 99; 359/634; 348/339; 349/71
See application file for complete search history.

(56) References Cited

U.S. PATENT DOCUMENTS
2010/0245777 A1* 9/2010 Ogura ............... 353/38

FOREIGN PATENT DOCUMENTS

| JP | 2004-341105 A | 12/2004 |
|----|---------------|---------|
| JP | 2006-220762 A | 8/2006 |
| JP | 2007-199538 A | 8/2007 |
| JP | 2007-218956 A | 8/2007 |
| JP | 2007-311357 A | 11/2007 |
| JP | 2008-052070 A | 3/2008 |

OTHER PUBLICATIONS

Japanese Office Action dated Jan. 6, 2011 (and English translation thereof) in counterpart Japanese Application No. 2009-155434.

* cited by examiner

*Primary Examiner* — Georgia Y Epps
*Assistant Examiner* — Don Williams
(74) *Attorney, Agent, or Firm* — Holtz, Holtz, Goodman & Chick, PC

(57) ABSTRACT

A light source device includes: a light emitting plate that has a plurality of segment regions including a transmissive portion that transmits light and a reflective portion on which a fluorescent substance layer; a light source that irradiates the fluorescent substance layer of the light emitting plate with the excitation light; a dichroic mirror that is disposed between the light source and the light emitting plate to transmit the excitation light and reflect fluorescent light from fluorescent substances of the fluorescent substance layer; and an optical device that condenses the excitation light transmitted by the transmissive portion of the light emitting plate and the fluorescent light reflected by the dichroic mirror on a single optical path to form a condensed light and radiate the condensed light toward the same direction.

14 Claims, 7 Drawing Sheets

FIG.7

| | FIRST OPTICAL AXIS CONVERTING MIRROR | | | SECOND OPTICAL AXIS CONVERTING MIRROR | | | THIRD OPTICAL AXIS CONVERTING MIRROR | | | FOURTH OPTICAL AXIS CONVERTING MIRROR | | |
|---|---|---|---|---|---|---|---|---|---|---|---|---|
| FIRST OPTICAL LAYOUT | DICHROIC MIRROR | | | REFLECTIVE MIRROR | | | REFLECTIVE MIRROR | | | DICHROIC MIRROR | | |
| | PROPERTY | BLUE LIGHT | TRANSMIT | PROPERTY | BLUE LIGHT | REFLECT | PROPERTY | BLUE LIGHT | - | PROPERTY | BLUE LIGHT | TRANSMIT |
| | | RED AND GREEN LIGHT | REFLECT | | RED AND GREEN LIGHT | - | | RED AND GREEN LIGHT | REFLECT | | RED AND GREEN LIGHT | REFLECT |
| SECOND OPTICAL LAYOUT | DICHROIC MIRROR | | | REFLECTIVE MIRROR | | | REFLECTIVE MIRROR | | | DICHROIC MIRROR | | |
| | PROPERTY | BLUE LIGHT | TRANSMIT | PROPERTY | BLUE LIGHT | REFLECT | PROPERTY | BLUE LIGHT | - | PROPERTY | BLUE LIGHT | REFLECT |
| | | RED AND GREEN LIGHT | REFLECT | | RED AND GREEN LIGHT | - | | RED AND GREEN LIGHT | REFLECT | | RED AND GREEN LIGHT | TRANSMIT |
| THIRD OPTICAL LAYOUT | DICHROIC MIRROR | | | DICHROIC MIRROR | | | REFLECTIVE MIRROR | | | REFLECTIVE MIRROR | | |
| | PROPERTY | BLUE LIGHT | TRANSMIT | PROPERTY | BLUE LIGHT | TRANSMIT | PROPERTY | BLUE LIGHT | - | PROPERTY | BLUE LIGHT | - |
| | | RED AND GREEN LIGHT | REFLECT | | RED AND GREEN LIGHT | REFLECT | | RED AND GREEN LIGHT | REFLECT | | RED AND GREEN LIGHT | REFLECT |
| FOURTH OPTICAL LAYOUT | DICHROIC MIRROR | | | DICHROIC MIRROR | | | REFLECTIVE MIRROR | | | REFLECTIVE MIRROR | | |
| | PROPERTY | BLUE LIGHT | TRANSMIT | PROPERTY | BLUE LIGHT | REFLECT | PROPERTY | BLUE LIGHT | - | PROPERTY | BLUE LIGHT | - |
| | | RED AND GREEN LIGHT | REFLECT | | RED AND GREEN LIGHT | TRANSMIT | | RED AND GREEN LIGHT | REFLECT | | RED AND GREEN LIGHT | REFLECT |
| FIFTH OPTICAL LAYOUT | DICHROIC MIRROR | | | REFLECTIVE MIRROR | | | DICHROIC MIRROR | | | REFLECTIVE MIRROR | | |
| | PROPERTY | BLUE LIGHT | TRANSMIT | PROPERTY | BLUE LIGHT | REFLECT | PROPERTY | BLUE LIGHT | REFLECT | PROPERTY | BLUE LIGHT | REFLECT |
| | | RED AND GREEN LIGHT | REFLECT | | RED AND GREEN LIGHT | - | | RED AND GREEN LIGHT | TRANSMIT | | RED AND GREEN LIGHT | - |
| SIXTH OPTICAL LAYOUT | DICHROIC MIRROR | | | REFLECTIVE MIRROR | | | DICHROIC MIRROR | | | REFLECTIVE MIRROR | | |
| | PROPERTY | BLUE LIGHT | TRANSMIT | PROPERTY | BLUE LIGHT | REFLECT | PROPERTY | BLUE LIGHT | TRANSMIT | PROPERTY | BLUE LIGHT | REFLECT |
| | | RED AND GREEN LIGHT | REFLECT | | RED AND GREEN LIGHT | - | | RED AND GREEN LIGHT | REFLECT | | RED AND GREEN LIGHT | - |
| SEVENTH OPTICAL LAYOUT | DICHROIC MIRROR | | | REFLECTIVE MIRROR | | | REFLECTIVE MIRROR | | | REFLECTIVE MIRROR | | |
| | PROPERTY | BLUE LIGHT | TRANSMIT | PROPERTY | BLUE LIGHT | REFLECT | PROPERTY | BLUE LIGHT | REFLECT | PROPERTY | BLUE LIGHT | REFLECT |
| | | RED AND GREEN LIGHT | REFLECT | | RED AND GREEN LIGHT | - | | RED AND GREEN LIGHT | - | | RED AND GREEN LIGHT | - |

LIGHT SOURCE DEVICE AND PROJECTOR

CROSS-REFERENCE TO THE RELATED APPLICATION(S)

The present application is based upon and claims priority from prior Japanese Patent Application No. 2009-155434, filed on Jun. 30, 2009, the entire content of which are incorporated herein by reference.

BACKGROUND

1. Field of the Invention

The present invention relates to a light source device and a projector including the light source device.

2. Description of the Related Art

Nowadays, data projectors are often used as image projection apparatuses for projecting a display image of a personal computer, a video image, an image based on image data stored in a memory card or the like onto a screen. In such a projector, light emitted from a light source is condensed on a micromirror display device called a DMD (Digital Micromirror Device) or a liquid crystal panel so as to display a color image on a screen.

Conventionally, use of high-luminance discharge lamps as light sources in such projectors has become the mainstream. In recent years, however, there have been many developments or proposals using light emitting diodes, laser diodes, organic ELs, phosphor emissions, etc. as light sources. For example, JP-A-2004-341105 discloses a light source device including a solid-state light source for emitting ultraviolet light as excitation light and a fluorescent wheel consisting of a disc-like transparent substrate on which there is disposed a fluorescent substance layer for receiving the ultraviolet light emitted as excitation light and converting the ultraviolet light into visible light.

According to the disclosure of JP-A-2004-341105, a visible light reflective film for transmitting ultraviolet light and reflecting visible light is formed on a wheel surface of the fluorescent wheel on which the ultraviolet light will be incident. Thus, the fluorescent substance layer disposed on the emission-side wheel surface is irradiated with the incident ultraviolet light to generate fluorescent light and emit the fluorescent light to the emission side. At the same time, fluorescent light emitted to the incident surface side from the fluorescent substance layer is also reflected to the emission side by the visible light reflective film. Thus, the quantity of fluorescent light emitted from the fluorescent wheel can be increased.

In addition, in order to prevent optical components from being damaged by irradiation with excitation light, for example, a blue laser diode which emits blue wavelength light as excitation light may be used as the solid-state light source of the aforementioned light source device. In this case, the fluorescent wheel is configured to have a diffusion layer formed on the wheel surface so that the blue wavelength light transmitted by the fluorescent wheel can be used as it is.

A reflective film for transmitting blue wavelength light and reflecting any other visible light has to be formed on the incident surface of the fluorescent wheel for use in such a light source device. Manufacturing the light source device therefore becomes labor-consuming, causing increase in cost.

To solve the problem, a light source device can be conceived to have the following configuration. That is, a wheel substrate is formed out of a metal plate or the like so that blue wavelength light serving as excitation light and fluorescent light including red and green wavelength lights and emitted from fluorescent substances can be reflected by a reflective surface of the metal plate. Thus, blue, green and blue wavelength lights are emitted in turn.

However, when optical paths of the red, green and blue wavelength lights are made to be one and the same in such a case, the blue wavelength source light is reflected and mixed with the red or green wavelength fluorescent light which emits when the red or green fluorescent substance layer is irradiated with the blue excitation light. Therefore, there may be a problem that color purities deteriorate.

In addition, since the incidence surface and the emission surface of the blue wavelength light in the fluorescent wheel are one and the same, there is a problem that special configuration of an optical layout or an optical component is required for separating an optical path for incidence of the blue source light from an optical path for emission of the blue source light.

SUMMARY

The present invention was developed in consideration of such problems in the background art. One of objects of the invention is to provide a light source device in which a fluorescent wheel itself is formed as a reflective plate without providing its fluorescent wheel surface with any special reflective layer for reflecting only light of a specific wavelength band, while a transmissive portion which can transmit source light is provided in a part of the reflective plate so that an emission light path of the source light emitted from the fluorescent wheel can be separated from an emission light path of fluorescent light of each color, so that the light source device can be made simple in configuration and easy in manufacturing, while light of each color can be emitted with high color purity. Another object of the invention is to provide a projector including the light source device.

A light source device according to the invention includes: a light emitting plate that has a plurality of segment regions in a substrate, at least one of the segment regions being formed as a reflective portion, a fluorescent substance layer being formed in the reflective portion to receive excitation light and emit light of a predetermined wavelength band in response to the received excitation light, at least one of the segment regions being formed as a transmissive portion which can transmit light; a light source that irradiates the fluorescent substance layer of the light emitting plate with the excitation light; a dichroic mirror that is disposed between the light source and the light emitting plate to transmit the excitation light and reflect fluorescent light from fluorescent substances of the fluorescent substance layer; and a plurality of reflective mirrors or dichroic mirrors that can condense, on one and the same optical path, the excitation light transmitted by the transmissive portion of the light emitting plate and the fluorescent light reflected by the dichroic mirror, and can radiate the condensed lights in one and the same direction.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 7 is a table showing examples of combinations of optical axis converting mirrors in the light source device according to the embodiment of the invention.

DETAILED DESCRIPTION

Figure 1:
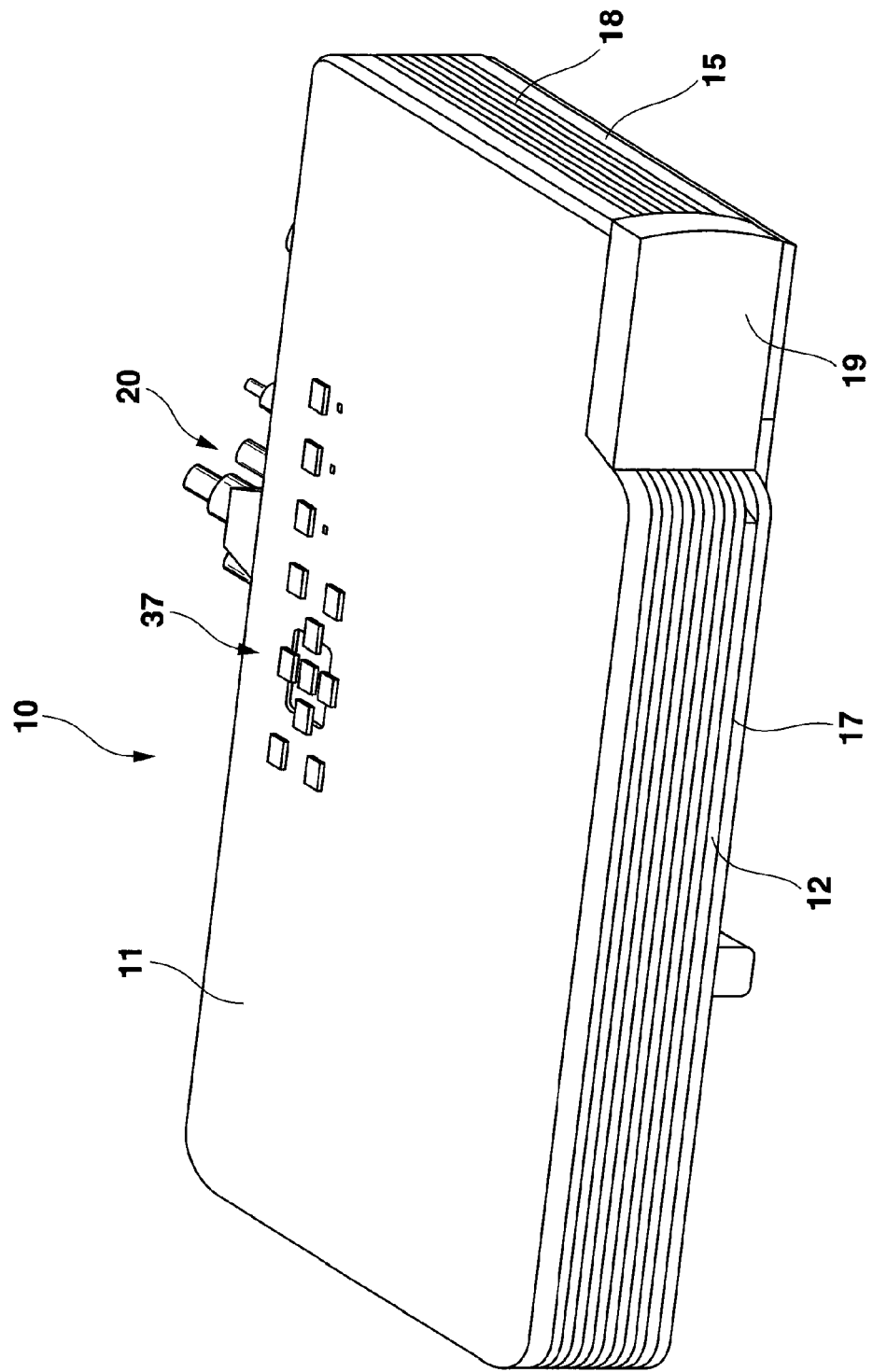
FIG. 1 is an external perspective view showing a projector including a light source device according to an embodiment of the invention.

An embodiment according to the present invention will be described in detail with reference to the accompanying drawings. The scope of the claimed invention should not be limited to the examples illustrated in the drawings and those described below.

In the following description, a projector 10 will be described as an embodiment of the present invention. The projector 10 is provided with a light source device 63, a display element 51, a cooling fan, a source-side optical system 62, a projection-side optical system 90, and a projector control unit. The source-side optical system 62 guides light from the light source device 63 to the display element 51. The projection-side optical system 90 projects an image emitted from the display element 51 onto a screen. The projector control unit controls the light source device 63 and the display element 51.

The light source device 63 has a fluorescent wheel 71 which is a light emitting plate. The fluorescent wheel 71 has three fan-shaped segment regions in a substrate which can be controllably rotated. The segment regions are adjacent to one another. Of the three, two segment regions are formed as reflective portions, in which fluorescent substance layers 131G and 131R are formed respectively. The fluorescent substance layer 131G emits green wavelength light in response to excitation light. The fluorescent substance layer 131R emits red wavelength light likewise. The remaining segment region is formed as a transmissive portion, which transmits light.

Specifically, the transmissive portion which can transmit excitation light and the reflective portions are disposed circumferentially, and a plurality of fluorescent substance layers 131 for emitting light in different wavelength bands are formed circumferentially in the reflective portions. The light source device 63 further has a wheel motor 73, a light source 72, a first optical axis converting mirror 1, and a plurality of reflective mirrors or dichroic mirrors. The wheel motor 73 is a drive unit for rotating the fluorescent wheel 71. The light source 72 irradiates the fluorescent substance layers 131 of the fluorescent wheel 71 with excitation light. The first optical axis converting mirror 1 is a dichroic mirror which is disposed between the light source 72 and the fluorescent wheel 71 so as to transmit the excitation light and reflect fluorescent light from the fluorescent substances. The reflective mirrors or dichroic mirrors can condense the excitation light transmitted by the transmissive portion of the fluorescent wheel 71 and the fluorescent light reflected by the first optical axis converting mirror 1 on one and the same optical path, and radiate the condensed lights in one and the same direction.

The light source 72 for irradiating the fluorescent wheel 71 with the excitation light is a laser light emitter which emits blue wavelength laser light. The fluorescent substance layers 131 are formed of a plurality of fluorescent substances. The fluorescent substances include a fluorescent substance which emits red wavelength light and a fluorescent substance which emits green wavelength light, as described above.

A diffusion layer 141 for diffusing the excitation light is formed in a diffusion plate 140 serving as the transmissive portion of the fluorescent wheel 71.

The light source device 63 has a condensing optical system which is formed out of a plurality of lenses and mirrors including the dichroic mirrors or the like. The lenses are disposed between the light source 72 and the fluorescent wheel 71 and on a path of the fluorescent light emitted from the fluorescent wheel 71 or the source light transmitted by the fluorescent wheel 71 so as to condense the lights in cooperation with the mirrors.

The condensing optical system has first to fourth optical axis converting mirrors 1 to 4. The first optical axis converting mirror 1 is a dichroic mirror disposed between the fluorescent wheel 71 and the light source 72 so as to transmit the source light emitted from the light source 72 without changing the optical axis of the source light, and convert the direction of the optical axis of the fluorescent light emitted from each fluorescent substance layer 131. The second optical axis converting mirror 2 is a normal reflective mirror for converting the direction of the optical axis of the source light transmitted by the diffusion layer 141 of the fluorescent wheel 71. The third optical axis converting mirror 3 further converts the optical axis of the fluorescent light converted by the first optical axis converting mirror 1. The fourth optical axis converting mirror 4 transmits the source light converted by the second optical axis converting mirror 2 without converting the optical axis of the source light and further converts the optical axis of the fluorescent light converted by the third optical axis converting mirror 3 so as to condense the fluorescent light and the source light on one and the same optical path.

Specifically, the first optical axis converting mirror 1 is disposed on the optical axis of the light source 72 and between the fluorescent wheel 71 and the light source 72. The second optical axis converting mirror 2 is disposed on the optical axis of the light source 72 and in an opposite position to the light source 72 with respect to the fluorescent wheel 71. The third optical axis converting mirror 3 is disposed on the optical axis of the fluorescent light converted by the first optical axis converting mirror 1. The fourth optical axis converting mirror 4 is disposed in opposition to the second and third optical axis converting mirrors 2 and 3.

The second to fourth optical axis converting mirrors 2 to 4 are composed of two reflective mirrors and one dichroic mirror. The reflective mirrors convert the optical axis of the source light or the fluorescent light. The dichroic mirror transmits the source light without converting the optical axis of the source light, and converts the axis of the fluorescent light.

The second optical axis converting mirror 2 is formed as a reflective mirror that converts by 90 degrees the optical axis of the source light transmitted by the diffusion layer 141 of the fluorescent wheel 71. The third optical axis converting mirror 3 is formed as a reflective mirror that converts by 90 degrees the optical axis of the fluorescent light converted by the first optical axis converting mirror 1. The fourth optical axis converting mirror 4 is formed as a dichroic mirror that converts by 90 degrees the optical axis of the fluorescent light converted by the third optical axis converting mirror 3 without changing the optical axis of the source light converted by the second optical axis converting mirror 2.

FIG. 1 is an external perspective view of the projector 10. In this embodiment, left and right will designate the left and right directions with respect to a projection direction, and front and rear will designate the front and rear directions with respect to a travelling direction of a pencil of rays emitted from the projector 10. As shown in FIG. 1, the projector 10 has a substantially rectangular boxed shape, in which a lens cover 19 for covering a projection opening is provided laterally next to a front panel 12 serving as a front side plate of a body casing, and a plurality of exhaust holes 17 are provided in the front panel 12. Further, an IR receiver for receiving a control signal from a not-shown remote controller is provided.

In addition, a user interface 37 is provided in a top panel 11 that serves as the body casing. Keys and indicators such as a power indicator, a projection switch key and an overheat indicator are disposed in the user interface 37. The power indicator informs a user of on/off of a power switch key or a power supply. The projection switch key switches on/off projection. The overheat indicator informs the user of overheat of the light source device, the display element, the control circuit or the like.

Further, various terminals 20 of an input/output connector, a power supply adaptor plug, etc. are provided on the back face of the body casing. In the input/output connector, USB terminals, a D-SUB terminal for image signal input, an S terminal, an RCA terminal, etc. are provided in a back panel. A plurality of intakes 18 are formed near the lower portions of a not-shown right panel 14 and a left panel 15 shown in FIG. 1. The panels 14 and 15 are side plates of the body casing.

Figure 2:
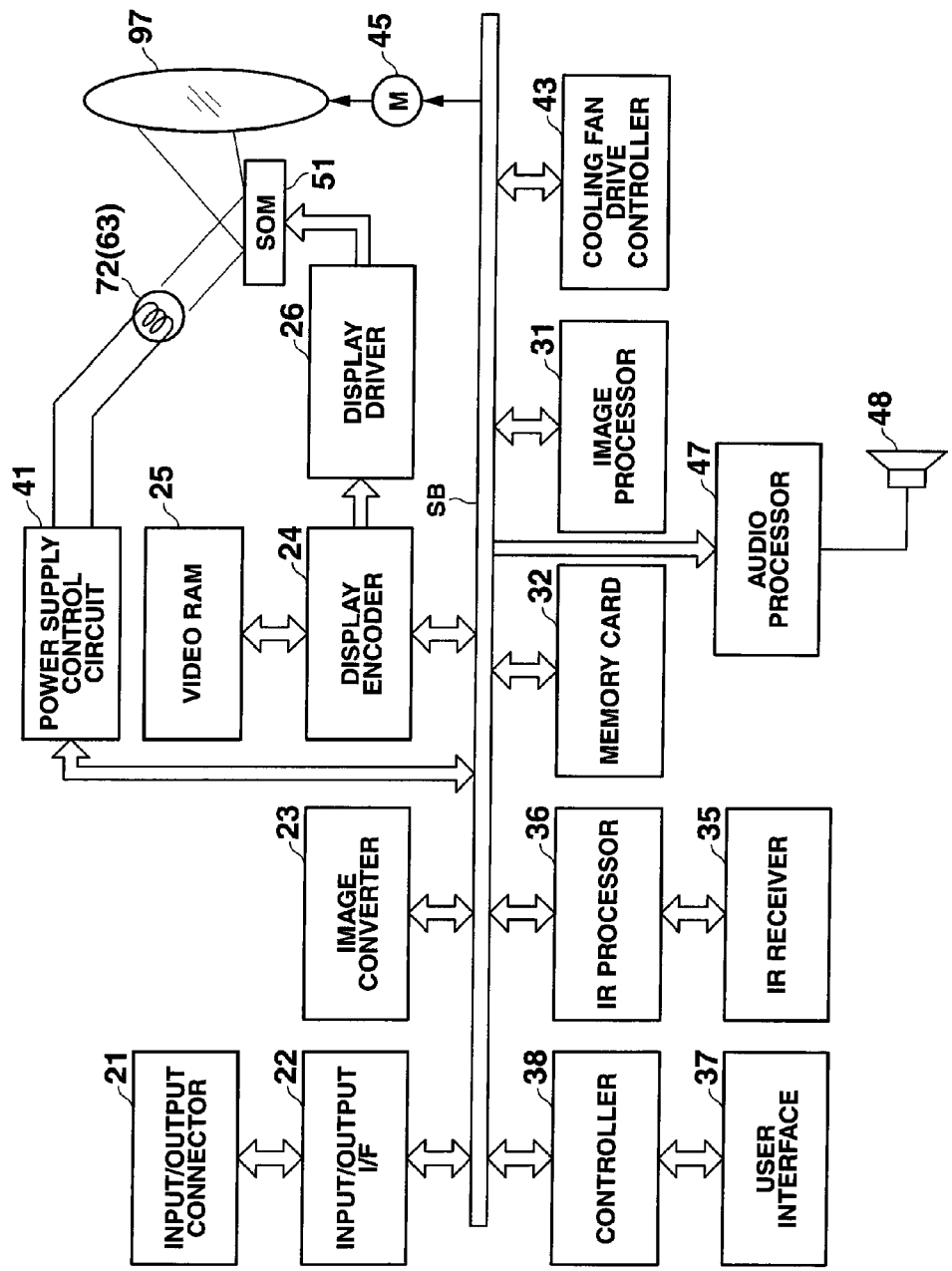
FIG. 2 is a diagram showing functional circuit blocks of the projector including the light source device according to the embodiment of the invention.

Next, a projector control unit of the projector 10 will be described with reference to the block diagram of FIG. 2. The projector control unit is configured by a controller 38, an input/output interface 22, an image converter 23, a display encoder 24 and a display driver 26. Image signals conforming to various standards and inputted from an input/output connector 21 are output through the input/output interface 22 and a system bus (SB) to the image converter 23. In the image converter 23, the image signals are converted into image signals of a predetermined unified format suitable to be displayed, and outputted to the display encoder 24.

The display encoder 24 expands and stores the inputted image signals in a video RAM 25, then generates video signals from the stored contents of the video RAM 25 and outputs the video signals to the display driver 26.

The display driver 26 drives the display element 51, which is a spatial optical modulator (SOM), at a proper frame rate in accordance with the image signals outputted from the display encoder 24. When the light source 72 of the light source device 63 is turned on, a pencil of rays emitted from the light source device 63 is made incident on the display element 51 through the source-side optical system so that an optical image is formed out of light reflected by the display element 51 controlled by the display driver 26. Thus, an image can be projected and displayed on a not-shown screen through a projection-system lens group serving as the projection-side optical system. A movable lens group 97 of the projection-side optical system is driven for zoom adjustment and focus adjustment by a lens motor 45.

An image processor 31 performs a recording process in which data of a luminance signal and a color-difference signal of an image signal are compressed by processing such as ADCT and Huffman encoding and sequentially written into a memory card 32 which is a removable recording medium. Further, in a reproduction mode, the image processor 31 performs a process in which image data recorded on the memory card 32 is read out, and individual image data forming a series of moving images is expanded frame by frame and outputted to the display encoder 24 through the image converter 23 so that the moving images or the like can be displayed based on the image data stored in the memory card 32.

The controller 38 manages operation control of each circuit in the projector 10. The controller 38 is configured by a CPU, a ROM fixedly storing operating programs such as various settings, a RAM used as a work memory, etc.

An operation signal of the user interface 37 configured by main keys, indicators, etc. provided in the top panel 11 of the body casing is set out directly to the controller 38. A key operation signal from the remote controller is received by an IR receiver 35, and a code signal demodulated by an IR processor 36 is outputted to the controller 38.

An audio processor 47 is connected to the controller 38 through the system bus (SB). The audio processor 47 has a sound source circuit of a PCM sound source or the like. In a projection mode and a reproduction mode, the audio processor 47 converts audio data into analog data, and drives a speaker 48 to reinforce and release sound.

In addition, the controller 38 controls a power supply control circuit 41. When the power switch key is operated, the power supply control circuit 41 turns on the light source 72 of the light source device 63. Further, the controller 38 controls a cooling fan drive control circuit 43 to perform temperature detection using a plurality of temperature sensors provided in the light source device 63 and so on, and control the rotational velocity of the cooling fan based on the result of the temperature detection. In addition, the controller 38 controls the cooling fan drive control circuit 43 to keep on rotating the cooling fan by use of a timer or the like even after the projector body is powered off. Further, in accordance with the result of the temperature detection using the temperature sensors, the controller 38 controls various components provided in the projector 10 to be powered off.

Figure 3:
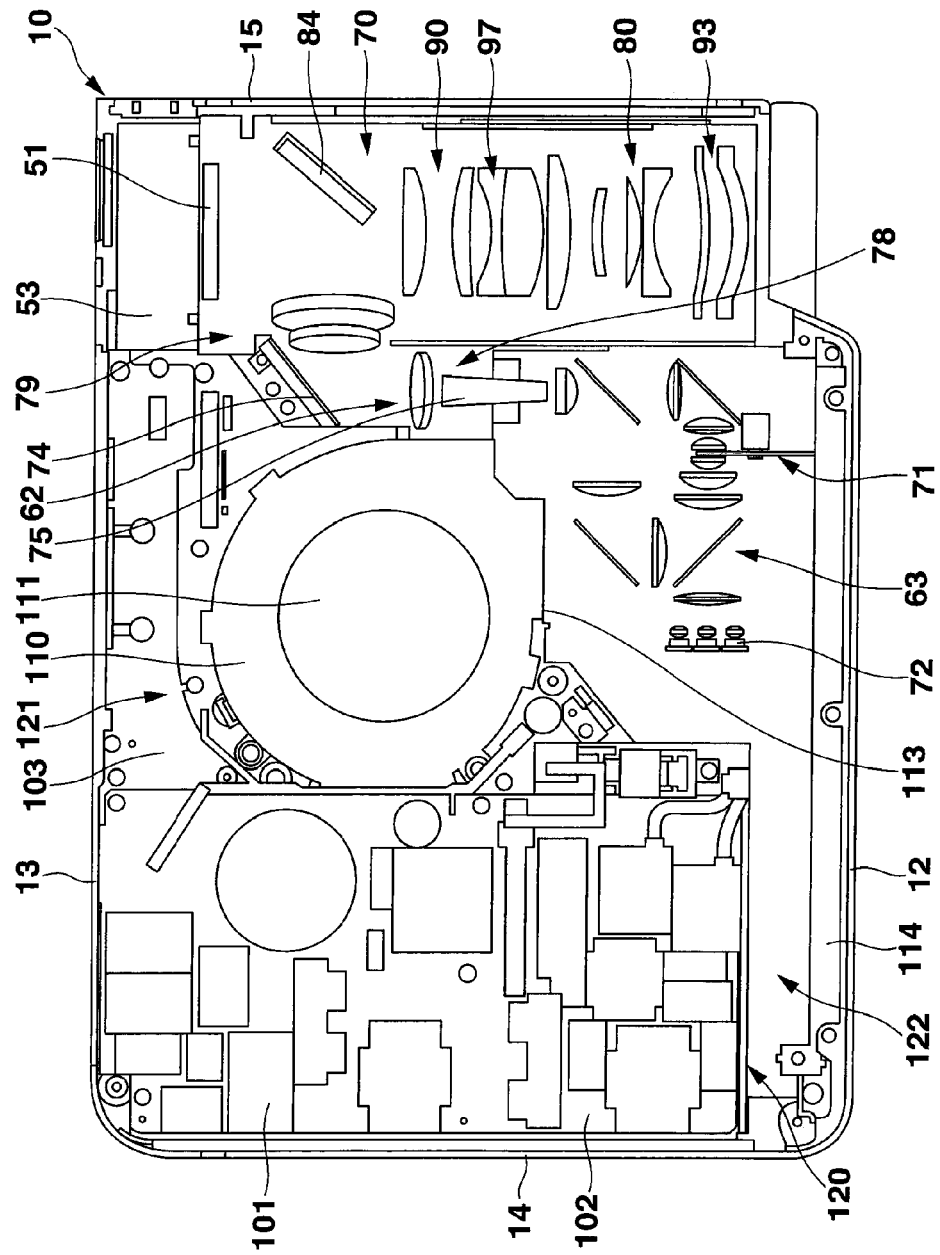
FIG. 3 is a schematic plan view showing an internal configuration of the projector including the light source device according to the embodiment of the invention.

Next, the internal configuration of the projector 10 will be described. FIG. 3 is a schematic plan view showing the internal configuration of the projector 10. In the projector 10, as shown in FIG. 3, a power supply control circuit board 102 to which a power supply circuit block 101 etc. are attached is disposed near the right panel 14, a sirocco fan type blower 110 is disposed substantially in the center, a control circuit board 103 is disposed near the blower 110, the light source device 63 is disposed near the front panel 12, and an optical system unit 70 is disposed near the left panel 15. In addition, the space inside the housing of the projector 10 is air-tightly sectioned into an intake-side spatial chamber 121 on the back panel 13 side and an exhaust-side spatial chamber 122 on the front panel 12 side by a sectioning partition 120. The blower 110 is disposed so that an inlet port 111 is located in the intake-side spatial chamber 121 and an outlet port 113 is located in the border between the exhaust-side spatial chamber 122 and the intake-side spatial chamber 121.

The optical system unit 70 has a substantially U-shape, which is configured by three blocks, that is, a lighting-side block 78 located near the light source device 63, an image generation block 79 located on the back panel 13 side, and a projection-side block 80 located between the lighting-side block 78 and the left panel 15.

The lighting-side block 78 has a part of the source-side optical system 62 by which light emitted from the light source device 63 is guided to the display element 51 belonging to the image generation block 79. The source-side optical system 62 belonging to the lighting-side block 78 includes a light guide device 75 by which a pencil of rays emitted from the light source device 63 can be formed into a luminous flux with a uniform intensity distribution, a condenser lens which can condense light transmitted by the light guide device 75, etc.

The image generation block 79 has an optical axis changing mirror 74, a plurality of condenser lenses and an irradiation mirror 84 as the source-side optical system 62. The optical axis changing mirror 74 changes the direction of the optical axis of the pencil of rays emitted from the light guide device 75. Light reflected by the optical axis changing mirror 74 is condensed on the display element 51 by the condenser lenses. By the irradiation mirror 84, the pencil of rays transmitted by the condenser lenses is radiated on the display element 51 at a predetermined angle. Further, the image generating block 79 has a DMD formed as the display element 51. A display element cooling unit 53 for cooling the display element 51 is disposed on the back panel 13 side of the display element 51 so as to prevent the display element 51 from reaching a high temperature.

The projection-side block 80 has a lens group of the projection-side optical system 90 for releasing light which is reflected by the display element 51 and forms an image onto a screen. The projection-side optical system 90 is a varifocal lens system with a zoom function, which includes a fixed lens group 93 built in a fixed lens-barrel and a movable lens group 97 built in a movable lens-barrel. The movable lens group 97 can be moved for zoom adjustment or focus adjustment by a lens motor.

In addition, in the internal configuration of the projector 10, members to be lower in temperature than the light source device 63 are disposed in the intake-side spatial chamber 121. Specifically, the power supply control circuit board 102, the blower 110, the control circuit board 103, the image generation block 79 of the optical system unit 70, the projection-side block 80 of the optical system unit 70, and the condenser lenses in the lighting-side block 78 of the optical system unit 70 are disposed in the intake-side spatial chamber 121.

On the other hand, the light source device 63 which may reach a comparatively high temperature, the light guide device 75 belonging to the lighting-side block 78 of the optical system unit 70, and an exhaust temperature reduction unit 114 are disposed in the exhaust-side spatial chamber 122.

The light source device 63 has a fluorescent wheel 71, a wheel motor 73, a plurality of light sources 72, and a plurality of mirrors. The fluorescent wheel 71 is a light emitting plate which is irradiated with light to thereby emit lights in wavelength bands of red, green and blue, which are the light's three primary colors. The wheel motor 73 is a drive unit for driving and rotating the fluorescent wheel 71. By the light sources 72, the fluorescent wheel 71 is irradiated with blue wavelength light. The mirrors guide the red, green and blue wavelength lights emitted from the fluorescent wheel 71 to the light guide device 75.

The light sources 72 are disposed so that the optical axis of each light source 72 can cross the optical axis of the light guide device 75 substantially at right angles. In addition, the fluorescent wheel 71 is disposed near the front panel 12 so as to face the light sources 72. Specifically, the fluorescent wheel 71 is disposed to set the wheel surface thereof to cross the optical axis of each light source 72 at right angles. That is, the rotational axis of the wheel motor 73 for rotating the fluorescent wheel 71 is parallel to the optical axis of each light source 72. In addition, the fluorescent wheel 71 is designed to emit red and green fluorescent lights toward the light sources 72 and transmit blue wavelength light from the light sources 72.

Figure 4A:
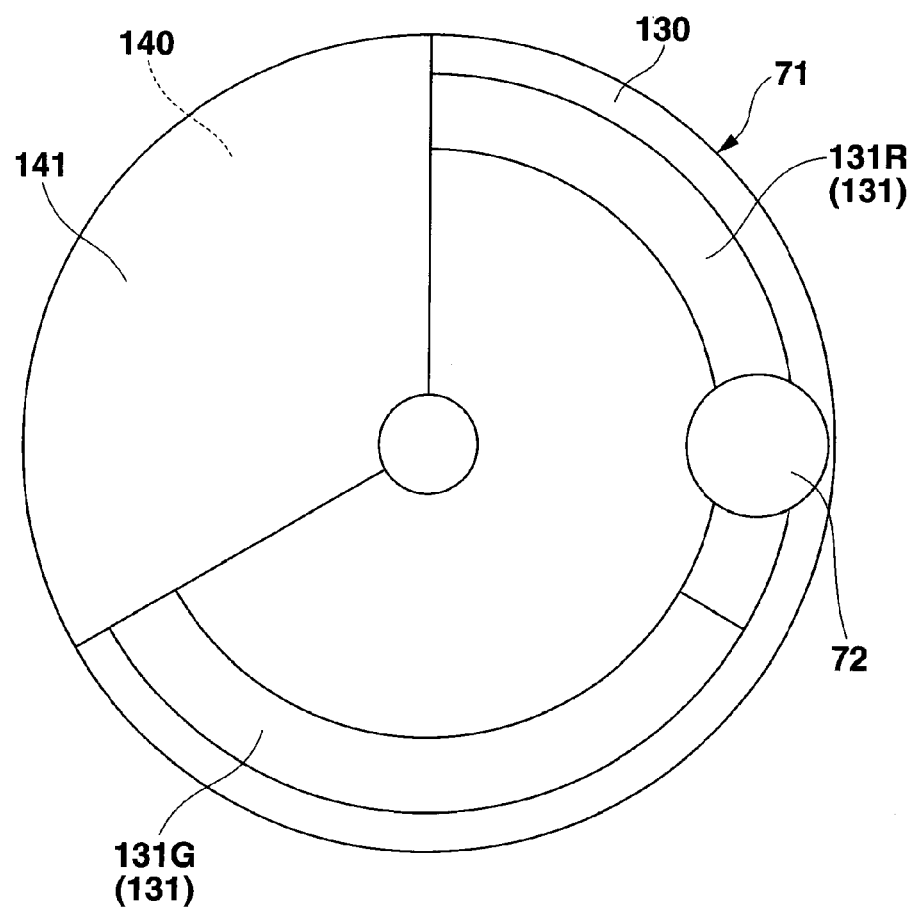
FIGS. 4A and 4B are a front view and a partially sectional view schematically showing a fluorescent wheel according to the embodiment of the invention.
Figure 4B:
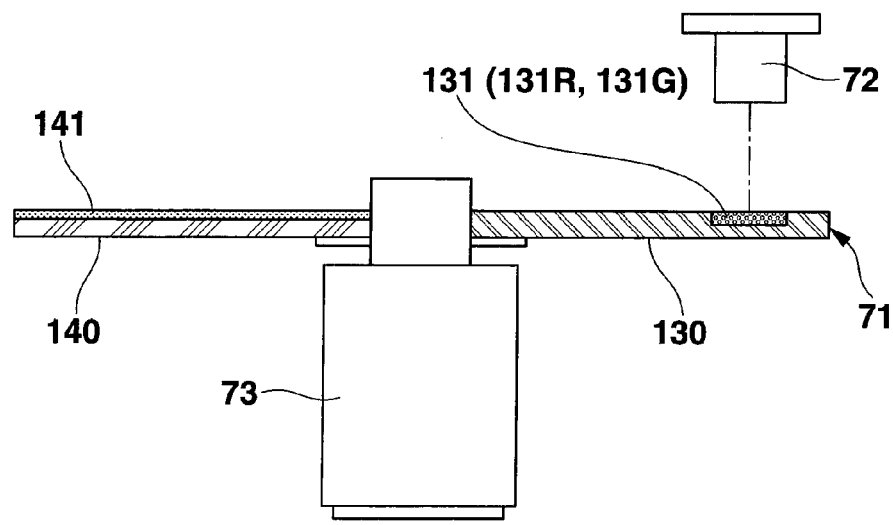

The fluorescent wheel 71 serving as a light emitting plate has three fan-shaped segment regions in a disc-like substrate as shown in FIG. 4A. Of the three, two segment regions are formed as reflective portions, and the remaining segment region is formed as a transmissive portion. Specifically, in the fluorescent wheel 71, a reflective plate 130 and a diffusion plate 140 are fixedly bonded to a motor hub so as to be formed integrally. In the reflective plate 130 serving as fan-shaped reflective portions, a red fluorescent substance layer 131R and a green fluorescent substance layer 131G are disposed circumferentially adjacently to each other as layers 131 of two kinds of fluorescent substances for emitting lights of different wavelength bands respectively. In the diffusion plate 140 serving as a fan-shaped transmissive portion, a diffusion layer 141 is disposed adjacently to the fluorescent substance layers 131. The motor hub is provided on a rotation shaft of the wheel motor 73. In addition, the reflective plate 130 and the diffusion plate 140 are bonded to each other on their boundary surfaces.

A circular opening corresponding to the shape of a columnar rotation shaft which is a connection portion of the fluorescent wheel 71 with the wheel motor 73 is formed in the central portion of the fluorescent wheel 71. The rotation shaft is inserted into the circular opening, and the motor hub is bonded to the reflective plate 130 and the diffusion plate 140 near their central portions so as to be firmly connected thereto.

Thus, the fluorescent wheel 71 rotates circumferentially and integrally, for example, at a rotational velocity of about 120 rps, by the wheel motor 73 serving as a drive unit which is driven and controlled by the controller 38 serving as a projector control unit.

The reflective plate 130 serving as the reflective portions consists of an opaque substrate made from a thermal conductive member such as a copper plate or an aluminum plate. By silver deposition or the like, a reflective layer for reflecting blue source light from the light source 72 and red and green wavelength fluorescent lights generated by the fluorescent substances is formed all over the light source 72 side surface of the reflective plate 130 to which the fluorescent substance layers 131 will be attached. The fluorescent substance layers 131 are formed on the reflective layer. The reflective layer can be formed easily by mirror finishing one surface of the reflective plate 130.

The two kinds of belt-like fluorescent substance layers 131 are formed by coating so as to be disposed circumferentially adjacently to each other near the outer circumferential portion of the reflective plate 130 which has a fan-like shape with a major arc wider than a semicircle. A red fluorescent substance layer 131R containing a fluorescent substance is formed on the reflective plate 130. When the fluorescent substance is irradiated with the source light, the fluorescent substance absorbs the light from the light sources 72 as excitation light. Thus, the excited fluorescent substance emits red wavelength light which is one of the primary colors. In the same manner, a green fluorescent substance layer 131G containing a fluorescent substance is formed adjacently to the red fluorescent substance layer 131R. When the fluorescent substance is irradiated with the source light, the fluorescent substance absorbs the light from the light sources 72 as excitation light. Thus, the excited fluorescent substance emits green wavelength light which is one of the primary colors. Each fluorescent substance layer 131 consists of fluorescent crystals and binder.

The diffusion plate 140 serving as the transmissive portion consists of a transparent substrate such as a glass substrate or a transparent resin substrate. The diffusion plate 140 has a diffusion layer 141 all over the light source 72 side surface. Specifically, in the diffusion plate 140, the whole of one surface of the transparent substrate having a fan shape with a minor arc about ⅓ as long as the circumference is subjected to optical treatment such as surface texturing by blasting or the like. Thus, the diffusion layer 141 is formed to provide a diffusion effect to incident blue source light which transmits the diffusion plate 140.

The diffusion plate 140 is disposed so as to be circumferentially adjacent to the reflective plate 130. Thus, the diffusion layer 141 is disposed adjacently to the fluorescent substance layers 131. The diffusion layer 141 may be formed by fixedly attaching a belt-like solid optical material as well as by applying the optical treatment to the surface of the transparent substrate. In addition, the diffusion layer 141 may be formed not on the light source 72 side but on the opposite surface thereto.

A laser light emitter or a blue light emitting diode which can radiate light to the fluorescent substance layers 131 and the diffusion layer 141 disposed near the outer circumferential portion of the fluorescent wheel 71 is used as each light source 72. The laser light emitter or blue light emitting diode can emit blue wavelength light which is a visible light with a shorter wavelength than any of the red and green wavelength lights emitted from the red and green fluorescent substance layers 131R and 131G.

In this manner, the light sources 72 and the fluorescent wheel 71 having the fluorescent substance layers 131 and the diffusion layer 141 are disposed oppositely to each other. Thus, the fluorescent light emitted from each of the fluorescent substance layers 131 formed in the reflective portions of the fluorescent wheel 71 can be separated from the source light transmitted by the diffusion plate 140 serving as the transmissive portion of the fluorescent wheel 71. That is, the fluorescent substance layers 131 and the diffusion layer 141 of the fluorescent wheel 71 which is rotating are irradiated with blue source light sequentially. Thus, fluorescent light is emitted toward the side of the light sources 72 when any fluorescent substance layer 131 of the fluorescent wheel 71 is irradiated with the source light emitted from the light sources 72 as excitation light. When the diffusion layer 141 of the transmissive portion of the fluorescent wheel 71 is irradiated with the source light emitted from the light sources 72, the source light is diffused and transmitted oppositely to the light sources 72.

The reflective layer is formed on the surface where the fluorescent substance layers 131 are disposed in the reflective plate 130 serving as the reflective portions. When the red fluorescent substance layer 131R is irradiated with directional source light from the light sources 72, the fluorescent substance of the red fluorescent substance layer 131R absorbs the blue light as excitation light and emits red wavelength fluorescent light omnidirectionally. Part of the red fluorescent light emitted toward the light sources 72 is incident on the light guide device 75 through the condensing optical system having mirrors. Red fluorescent light emitted toward the opaque substrate is reflected by the reflective layer. Most of the reflected light is incident on the light guide device 75 through the condensing optical system having the mirrors, as light emitted from the fluorescent wheel 71.

The blue source light radiated to the reflective layer without being absorbed by the fluorescent substance of the red fluorescent substance layer 131R can be reflected by the reflective layer and emitted again toward the red fluorescent substance layer 131R so as to excite the fluorescent substance. Therefore, efficiency of using the blue source light can be improved and light emission can be made bright.

On the other hand, blue source light reflected by the reflective layer and returning from the red fluorescent substance layer 131R toward the light sources 72 without being absorbed by the fluorescent substance travels from the red fluorescent substance layer 131R toward the light sources 72 together with the red fluorescent light. However, the blue source light is separated from the red fluorescent light by a dichroic mirror serving as an optical axis converting mirror which can reflect red light and transmit blue light. That is, of the light emitted from the fluorescent wheel 71 toward the light sources 72, only the red fluorescent light is reflected by the dichroic mirror and incident on the light guide device 75 through other mirrors or lenses of the condensing optical system.

In the same manner, when the green fluorescent substance layer 131G is irradiated with light from the light sources 72, green wavelength fluorescent light is emitted from the green fluorescent substance as brightly as the red fluorescent light. The green fluorescent light is separated from blue source light reflected by the optical axis converting mirror and returning toward the light sources 72, and then incident on the light guide device 75 through other mirrors or lenses of the condensing optical system.

When the diffusion layer 141 is irradiated with source light such as blue wavelength laser light from the light sources 72, the diffusion layer 141 provides a diffusion effect to the blue source light incident thereon. Thus, blue light formed as diffused light in the same manner as the lights (red light and green light) emitted from the fluorescent substance layers 131 is emitted from the diffusion layer 141. The blue light is incident on the light guide device 75 through the condensing optical system having the mirrors.

As a result, when directional source light is emitted from the light sources 72 while the fluorescent wheel 71 is rotated, red, green and blue wavelength lights are sequentially incident on the light guide device 75 from the fluorescent wheel 71 through the condensing optical system having the mirrors. The DMD which is the display element 51 of the projector 10 displays light of each color in accordance with data by time division. Thus, a color image can be generated on a screen.

Figure 5:
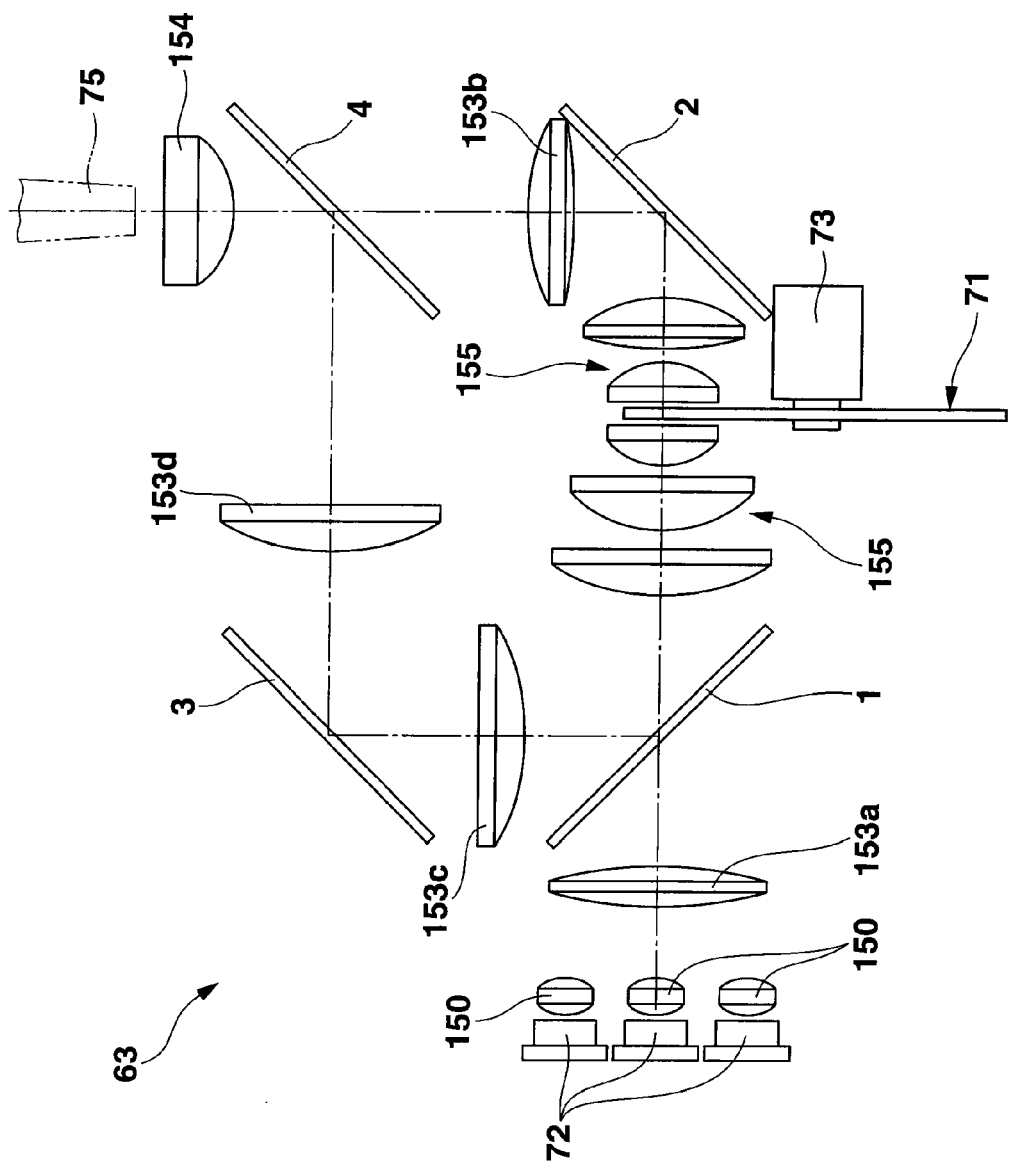
FIG. 5 is a schematic plan view showing the light source device according to the embodiment of the invention.

As shown in FIG. 5, the light source device 63 has collimator lenses 150 disposed on the optical axes of the light sources 72 and on their emitting side respectively. By the collimator lenses 150, light emitted from the light sources 72 is converted into parallel beams. The light source device 63 has a condensing optical system configured by first to fourth optical axis converting mirrors 1 to 4, a plurality of convex lenses, etc. Each optical axis converting mirror 1-4 reflects or transmits light of a predetermined wavelength band emitted from the fluorescent wheel 71 so as to condense the light of each color emitted from the fluorescent wheel 71 onto one and the same optical path. The convex lenses condense pencils of rays emitted from the fluorescent wheel 71 and incident on the light guide device 75.

The condensing optical system according to this embodiment will be described below. The condensing optical system has four optical axis converting mirrors which are disposed in predetermined positions so that the optical axis of red/green fluorescent light and the optical axis of blue source light emitted and separated in different directions from the fluorescent wheel 71 can be brought into line with each other, and the red/green light and the blue light can be condensed on one and the same optical path. The optical axis converting mirrors consist of a dichroic mirror which is disposed between the light sources 72 and the fluorescent wheel 71 so as to transmit excitation light and reflect fluorescent light from the fluorescent substances, and a plurality of reflective mirrors or dichroic mirrors which can condense the excitation light transmitted by the transmissive portion of the fluorescent wheel 71 and the fluorescent light reflected by the dichroic mirror on one and the same optical path and radiate the condensed lights in one and the same direction.

Specifically, the condensing optical system has first to fourth optical axis converting mirrors 1 to 4. The first optical axis converting mirror 1 is a dichroic mirror which is disposed between the fluorescent wheel 71 and the light sources 72 so as to transmit source light emitted from the light sources 72 without changing the optical axis of the source light and convert the direction of the optical axis of the fluorescent light emitted from each fluorescent substance layer 131. The second optical axis converting mirror 2 converts the direction of the optical axis of the source light transmitted by the diffusion layer 141 of the fluorescent wheel 71. The third and fourth optical axis converting mirrors 3 and 4 further convert the optical axis of the fluorescent light converted by the first optical axis converting mirror 1 and the optical axis converted by the second optical axis converting mirror 2 so as to bring the optical axis of the fluorescent light and the optical axis of the source light into line with each other and condense the fluorescent light and the source light on one and the same optical path.

According to this embodiment, the first optical axis converting mirror 1 is a dichroic mirror which is disposed on the optical axes of the light sources 72 and between the light sources 72 and the fluorescent wheel 71 so as not to change the optical axis of the blue source light emitted from the light sources 72 but to convert, by 90 degrees, the direction of the optical axis of the red/green fluorescent light emitted from the fluorescent wheel 71. That is, the first optical axis converting mirror 1 transmits the blue source light emitted from the light sources 72 as excitation light and reflects the red/green wavelength fluorescent light emitted from the fluorescent substance of each fluorescent substance layer 131 of the fluorescent wheel 71 while changing the direction of the red/green wavelength fluorescent light by the angle of 90 degrees.

The second optical axis converting mirror 2 is a normal reflective mirror which is disposed on the optical axes of the light sources 72 and on the opposite side to the light sources 72 with respect to the fluorescent wheel 71 so as to convert, by 90 degrees, the optical axis of the blue source light transmitted by the diffusion layer 141 in the transmissive portion of the fluorescent wheel 71. That is, the second optical axis converting mirror 2 reflects the blue wavelength light emitted from the fluorescent wheel 71 while changing the direction of the blue wavelength light by the angle of 90 degrees. The second optical axis converting mirror 2 may be formed not as the reflective mirror but as a dichroic mirror which can reflect blue wavelength light.

The third optical axis converting mirror 3 is a reflective mirror which is disposed to face the first optical axis converting mirror 1 on the optical axis of the red/green fluorescent light converted by the first optical axis converting mirror 1, so as to convert, by 90 degrees, the optical axis of the fluorescent light converted by the first optical axis converting mirror 1. That is, the third optical axis converting mirror 3 reflects the red/green wavelength fluorescent light reflected by the first optical axis converting mirror 1 while further changing the direction of the red/green wavelength fluorescent light by the angle of 90 degrees. The third optical axis converting mirror 3 may be formed not as the reflective mirror but as a dichroic mirror which can reflect red and green lights.

The fourth optical axis converting mirror 4 is a dichroic mirror which is disposed to face the second optical axis converting mirror 2 and the third optical axis converting mirror 3 so as to convert, by 90 degrees, the optical axis of the red/green fluorescent light converted by the third optical axis converting mirror 3 without changing the optical axis of the blue source light converted by the second optical axis converting mirror 2. That is, the fourth optical axis converting mirror 4 is disposed in a position where the optical axis of the blue source light reflected by the second optical axis converting mirror 2 crosses the optical axis of the red/green wavelength fluorescent light reflected by the third optical axis converting mirror 3, so as to transmit the blue source light reflected by the second optical axis converting mirror 2 and make the transmitted blue source light travel straight, while reflecting the red/green wavelength fluorescent light to change the direction of the red/green wavelength fluorescent light reflected by the third optical axis converting mirror 3 by the angle of 90 degrees.

As a result, the blue source light transmitted by the fourth optical axis converting mirror 4 and the red/green fluorescent light reflected by the fourth optical axis converting mirror 4 can be condensed on one and the same optical path, and all the lights of the colors can be emitted in one and the same direction.

In this manner, the four optical axis converting mirrors 1 to 4 are disposed in the condensing optical system so as to convert the optical axis of each color light emitted from the fluorescent wheel 71 and bring the optical axis of the color light into line with the optical axis of the light guide device 75. Thus, all the lights of the colors can be condensed on one and the same optical path and radiated in one and the same direction so that all the lights of the colors emitted from the fluorescent wheel 71 can be made incident on the light guide device 75 sequentially.

The condensing optical system is formed out of a plurality of lenses and mirrors such as dichroic mirrors. The lenses are disposed between the light sources 72 and the fluorescent wheel 71 and on the path of the fluorescent light from the fluorescent wheel 71 or the source light transmitted by the fluorescent wheel 71 so as to condense the lights in cooperation with the mirrors. Thus, pencils of rays whose travelling directions have been changed by the mirrors are condensed by the lenses so that the lights can be made incident on the light guide device 75 efficiently.

Specifically, when the light sources 72 are blue light emitting diodes, blue lights emitted from the light sources 72 are formed into parallel lights by the collimator lenses 150 respectively. Alternatively, when the light sources 72 are blue laser light emitters, blue lights are formed into parallel lights with increased directivity by the collimator lenses 150 respectively. The parallel lights are condensed by a first convex lens 153a disposed between the collimator lenses 150 and the first optical axis converting mirror 1. In addition, due to a condenser lens group 155 disposed near the front and back sides of the fluorescent wheel 71 respectively, blue wavelength light condensed by the first convex lens 153a is further condensed by the condenser lens group 155, and the fluorescent wheel 71 is irradiated with the condensed light. At the same time, pencils of rays emitted from the front and back sides of the fluorescent wheel 71 are also condensed.

Further, a second convex lens 153b is disposed between the second optical axis converting mirror 2 and the fourth optical axis converting mirror 4. A third convex lens 153c is disposed between the first optical axis converting mirror 1 and the third optical axis converting mirror 3. A fourth convex lens 153d is disposed between the third optical axis converting mirror 3 and the fourth optical axis converting mirror 4. Further, a light guide device entrance lens 154 is disposed between the fourth optical axis converting mirror 4 and the light guide device 75. Thus, light emitted from the fluorescent wheel 71 is formed into a condensed pencil of rays, which is incident on the light guide device 75.

Thus, the blue source light emitted from the light sources 72 through the collimator lenses 150 is condensed by the first convex lens 153a, transmitted by the first optical axis converting mirror 1, further condensed by the condenser lens group 155, and radiated to the fluorescent substance layers 131 or the diffusion layer 141 of the fluorescent wheel 71.

Then, when the diffusion layer 141 of the diffusion plate 140 serving as the transmissive portion of the fluorescent wheel 71 is irradiated with the source light, blue source light transmitted by the diffusion layer 141 is formed into diffused light, and condensed by the condenser lens group 155 disposed on the opposite side of the fluorescent wheel 71 to the light sources 72. Then, the second optical axis converting mirror 2 is irradiated with the condensed blue source light. In addition, the blue source light is reflected by the second optical axis converting mirror 2 and then condensed by the second convex lens 153b. After that, the condensed blue source light is transmitted by the fourth optical axis converting mirror 4 and condensed by the light guide device entrance lens 154. Thus, the condensed blue source light is incident on the light guide device 75.

When any of the fluorescent substance layers 131 of the reflective plate 130 serving as the reflective portions of the fluorescent wheel 71 is irradiated with the source light, red or green wavelength fluorescent light is emitted toward the source lights 72. The fluorescent light is condensed by the condenser lens group 155 on the light source 72 side of the fluorescent wheel 71, and radiated to the first optical axis converting mirror 1. Here, the fluorescent light is reflected by the first optical axis converting mirror 1. However, the blue source light reflected without being absorbed by the fluorescent substance of the fluorescent substance layer 131 is transmitted by the first optical axis converting mirror 1. Thus, the red or green fluorescent light and the blue source light are separated so that their color purities can be prevented from deteriorating.

In addition, the fluorescent light reflected by the first optical axis converting mirror 1 is condensed by the third convex lens 153c, and radiated to the third optical axis converting mirror 3. The fluorescent light is reflected by the third optical axis converting mirror 3, and condensed by the fourth convex lens 153d. After that, the fluorescent light is radiated to the fourth optical axis converting mirror 4. The fluorescent light is further reflected by the fourth optical axis converting mirror 4 and condensed by the light guide device entrance lens 154. Thus, the fluorescent light is incident on the light guide device 75.

In this manner, according to the invention, a special reflective layer for reflecting only specific wavelength light is not provided on the surface of the fluorescent wheel 71, but the fluorescent wheel 71 itself is formed as the reflective plate 130 and the diffusion plate 140 including the diffusion layer 141 for transmitting source light and diffusing the source light is provided as a transmissive portion in a part of the reflective plate 130. Thus, the emission optical paths of the source light and the fluorescent light of each color emitted from the fluorescent wheel 71 can be separated. It is therefore possible to provide the light source device 63 which is simple in configuration and easy in manufacturing, and the projector 10 having the light source device 63.

The light emitted from the fluorescent wheel 71 includes not only red or green fluorescent light but also a slight volume of blue source light reflected by the fluorescent wheel 71. However, since the first optical axis converting mirror 1 formed as a dichroic mirror is disposed between the light sources 72 and the fluorescent wheel 71, the blue source light reflected by the fluorescent wheel 71 and mixed with the red or green wavelength fluorescent light can be cut. It is therefore possible to provide the light source device 63 in which the source light can be surely prevented from being mixed with the fluorescent light and each color light can be emitted with high color purity, and the projector 10 having the light source device 63.

When blue wavelength laser light emitters are used as the light sources 72, each fluorescent substance can be excited to generate light efficiently. In addition, when the fluorescent substance layers 131 containing at least a fluorescent substance for emitting red wavelength light and a fluorescent substance for emitting green wavelength light are formed in the fluorescent wheel 71, it is possible to generate lights of red and green wavelength bands belonging to the primary colors. Further, when the diffusion layer 141 is provided in the transmissive portion, directional laser light can be diffused and transmitted so that light of a blue wavelength band belonging to the primary colors can be made incident on the light guide device 75 as diffused light similar to the fluorescent light.

Incidentally, the transmissive portion may be formed out of a normal glass plate or a space as a through hole with a frame formed circumferentially, without providing the diffusion layer 141 in the transmissive portion. In this case, a diffusion plate is fixedly disposed on an optical path of blue source light, for example, on the light source 72 side just close to the fluorescent wheel 71 or between the fluorescent wheel 71 and the second optical axis converting mirror 2. Further, when blue light emitting diodes are used as the light sources 72, the light source device 63 may be configured so that the diffusion layer 141 is not provided on the transmissive portion or on the optical path of the blue source light.

Various configurations can be used as the kinds and layout of the optical axis converting mirrors 1 to 4 for use in the condensing optical system of the light source device 63.

Embodiments about other variations of the layout of the optical axis converting mirrors 1 to 4 will be described below with reference to FIGS. 6A-6G and FIG. 7.

Figure 6A:
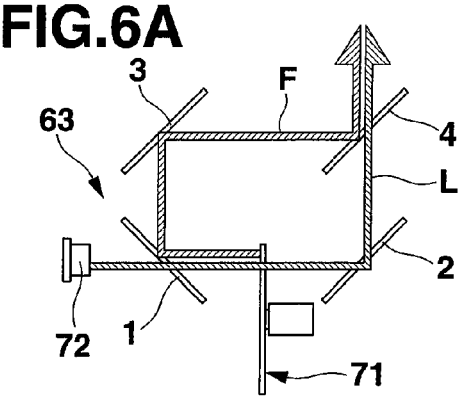
FIGS. 6A-6G are schematic views showing variations of optical paths of source light and fluorescent light in the light source device according to the embodiment of the invention.
Figure 6B:
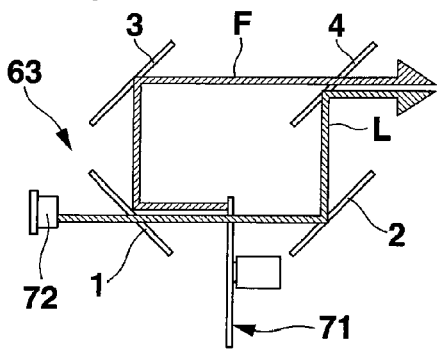
Figure 6C:
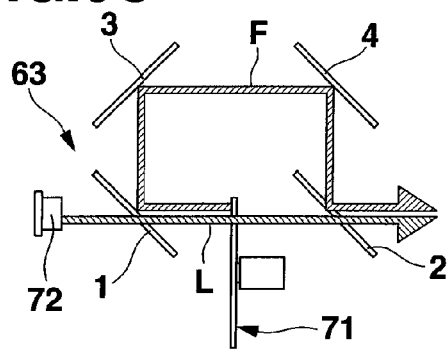
Figure 6D:
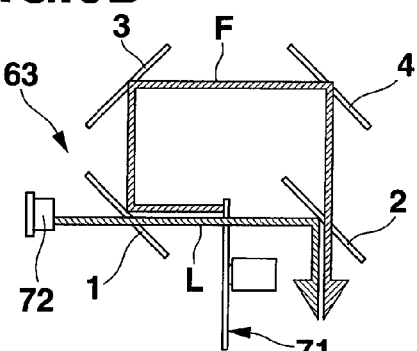
Figure 6E:
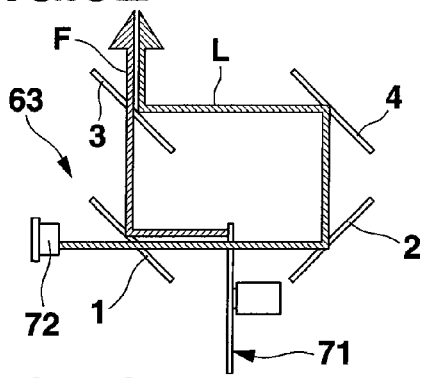
Figure 6F:
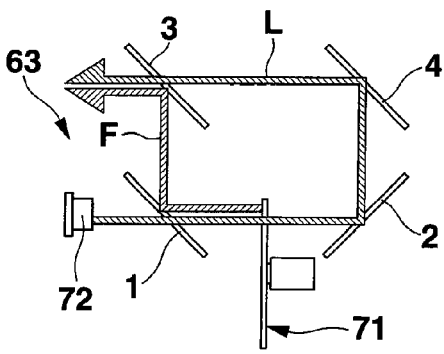
Figure 6G:
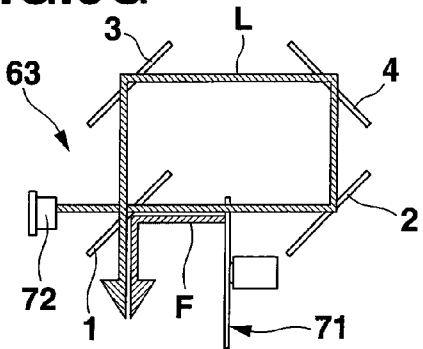

FIG. 6A is a schematic view showing an optical path L of source light emitted from the light source 72 and an optical path F of fluorescent light emitted in response to the source light in the optical layout (see FIG. 5) of the aforementioned light source device 63. That is, in a first optical layout shown in FIG. 6A, the first optical axis converting mirror 1 is formed as a dichroic mirror which can transmit blue source light and reflect red and green fluorescent lights as shown in FIG. 7. The second optical axis converting mirror 2 is a reflective mirror which can reflect the blue source light. The third optical axis converting mirror 3 is a reflective mirror which can reflect the red and green fluorescent lights. The fourth optical axis converting mirror 4 is a dichroic mirror which can transmit the blue source light and reflect the red and green fluorescent lights.

The optical layout may be modified into a second optical layout (see FIG. 6B) in which the fourth optical axis converting mirror 4 in the first optical layout is formed as a dichroic mirror which can reflect the blue source light and transmit the red and green fluorescent lights as shown in FIG. 7.

Further, a third optical layout (see FIG. 6C) may be used. In the third optical layout, the second optical axis converting mirror 2 is formed as a dichroic mirror which can transmit the blue source light and reflect the red and green fluorescent lights, and the fourth optical axis converting mirror 4 is formed as a reflective mirror. In this manner, only the fluorescent lights are reflected repeatedly so that the source light and each fluorescent light can be condensed on one and the same optical path on the optical axis of the light source 72.

Another optical layout, that is, a fourth optical layout (see FIG. 6D) may be arranged. In the fourth optical layout, the second optical axis converting mirror 2 in the third optical layout is formed as a dichroic mirror which can reflect the blue source light and transmit the red and green fluorescent lights.

Further, a fifth optical layout (see FIG. 6E) may be used as the condensing optical system of the light source device 63. In the fifth optical layout, the second optical axis converting mirror 2 is formed as a reflective mirror which can convert, by 90 degrees, the optical axis of the blue source light transmitted by the diffusion layer 141 of the diffusion plate 140 of the fluorescent wheel 71, the fourth optical axis converting mirror 4 is formed as a reflective mirror which can convert, by 90 degrees, the optical axis of the blue source light converted by the second optical axis converting mirror 2, and the third optical axis converting mirror 3 is formed as a dichroic mirror which does not change the optical axes of the red and green fluorescent lights converted by the first optical axis converting mirror 1 but can converts, by 90 degrees, the optical axis of the blue source light converted by the fourth optical axis converting mirror 4.

In addition, another optical layout, that is, a sixth optical layout (see FIG. 6F) may be arranged. In the sixth optical layout, the third optical axis converting mirror 3 in the fifth optical layout is formed as a dichroic mirror which can transmit the blue source light and reflect the red and green fluorescent lights.

Moreover, a seventh optical layout (see FIG. 6G) may be used. The optical layout is not limited to the aforementioned layout in which the second to fourth optical axis converting mirrors 2 to 4 consist of two reflective mirrors each converting the optical axis of the source light or the fluorescent light and one dichroic mirror for converting one of the optical axes of the source light and the fluorescent light without converting the other, as described above (see FIGS. 6A-6F). In the seventh optical layout, the second to fourth optical axis converting mirrors 2 to 4 consist of three reflective mirrors for converting the optical axis of the blue source light. In this optical layout, the blue source light is chiefly reflected repeatedly so that the blue source light can be condensed on the same optical path as the red and green fluorescent lights.

In this manner, various optical layouts can be used when the second to fourth optical axis converting mirrors 2 to 4 are disposed in predetermined positions and angles while various combinations are made about the characteristics of the second to fourth optical axis converting mirrors 2 to 4. Accordingly, not only is it possible to provide the light source device 63 and the projector 10 high in color purity and easy in manufacturing as described above, but it is also possible to enhance the degree of freedom in the layout of an apparatus such as the projector 10 mounted with the light source device 63.

According to the invention, it is possible to provide a light source device in which a fluorescent wheel itself is formed as a reflective plate without providing its fluorescent wheel surface with any special reflective layer for reflecting only light of a specific wavelength band, while a transmissive portion which can transmit source light is provided in a part of the reflective plate so that an emission path of the source light emitted from the fluorescent wheel can be separated from an emission path of fluorescent light of each color, so that the light source device can be made simple in configuration and easy in manufacturing, while light of each color can be emitted with high color purity. It is also possible to provide a projector including the light source device.

The invention is not limited to the aforementioned embodiments, but may be changed or modified desirably without departing from the gist of the invention. For example, the fluorescent substance layers 131 disposed in the reflective plate 130 are not limited to the case where the red and green fluorescent substance layers 131R and 131G are disposed, but the fluorescent substance layers 131R and 131G may be disposed together with another fluorescent substance layer which can emit light of a wavelength band of a complementary color such as yellow.

The number of the optical axis converting mirrors disposed in the light source device 63 is not limited to four, but five or more optical axis converting mirrors may be disposed so that source light and fluorescent light separated from each other can be condensed on one and the same optical path. Preferably, when the four optical axis converting mirrors 1 to 4 are provided, the light source device 63 can be made simple and compact.

In the aforementioned embodiments, dichroic mirrors are used for converting the directions of optical axes or selecting transmission or reflection of light in accordance with wavelength thereof. However, the invention is not limited thereto, but the dichroic mirrors may be replaced by other alternative means such as dichroic prisms.

Further, the fluorescent wheel 71 may be formed not into a disc-like shape but as a rectangular light emitting plate, and fixedly disposed. In this case, an adjustment unit is disposed between the light sources 72 and the light emitting plate so as to change the direction of irradiation with light from each light source 72. Alternatively, a light source drive unit for driving to change the position of each light source 72 and/or the direction of irradiation therewith may be provided so that a spot irradiated with light from the light source 72 can be placed in segment regions in turn. Thus, light of each color can be made incident on the light guide device 75 through a condensing optical system. As the adjustment unit, it is, for example, possible to use an optical deflector employing various devices, such as a KTN crystal, an acoustooptic element and a MEMS mirror.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A light source device comprising:
 a light emitting plate that has a plurality of segment regions on a substrate, at least one of the segment regions being formed as a reflective portion on which a fluorescent substance layer is formed to receive excitation light and emit light of a predetermined wavelength band in response to the received excitation light, and at least one of the segment regions being formed as a transmissive portion that transmits light;
 a light source that irradiates the fluorescent substance layer of the light emitting plate with the excitation light;
 a dichroic mirror that is disposed between the light source and the light emitting plate to transmit the excitation light and reflect fluorescent light from the fluorescent substance layer; and
 an optical device that condenses the excitation light transmitted by the transmissive portion of the light emitting plate and the fluorescent light reflected by the dichroic mirror on a single optical path to form a condensed light and radiate the condensed light toward the same direction.

2. The device according to claim 1, wherein the light source is a blue wavelength laser light emitter.

3. The device according to claim 2, wherein the fluorescent substance layer comprises a first fluorescent substance that emits red wavelength light and a second fluorescent substance that emits green wavelength light.

4. The device according to claim 2, wherein the light emitting plate comprises a diffusion layer formed in the transmissive portion, the diffusion layer being configured to diffuse the excitation light.

5. The device according to claim 1, further comprising:
a condensing optical system that comprises a plurality of lenses and mirrors comprising the dichroic mirror, the condensing optical system being disposed between the light source and the light emitting plate and on a path of the fluorescent light from the light emitting plate and the excitation light transmitted by the light emitting plate.

6. The device according to claim 5, wherein the condensing optical system comprises:
a first optical axis converting mirror that is configured by the dichroic mirror disposed between the light emitting plate and the light so as to transmit the excitation light emitted from the light source without changing an optical axis of the excitation light, and convert a direction of an optical axis of the fluorescent light emitted from the fluorescent substance layer;
a second optical axis converting mirror that is configured by one of (1) a dichroic mirror or a normal reflective mirror for converting a direction of the optical axis of the excitation light transmitted by the transmissive portion of the light emitting plate or (2) a dichroic mirror for transmitting the excitation light without converting the optical axis of the excitation light;
a third optical axis converting mirror; and
a fourth optical axis converting mirror.

7. The device according to claim 6, wherein the first optical axis converting mirror is disposed on the optical axis of the light source and between the light emitting plate and the light source,
wherein the second optical axis converting mirror is disposed on the optical axis of the light source and in an opposite position to the light source with respect to the light emitting plate,
wherein the third optical axis converting mirror is disposed on the optical axis of the fluorescent light converted by the first optical axis converting mirror, and
wherein the fourth optical axis converting mirror is disposed in opposition to the second and third optical axis converting mirrors.

8. The device according to claim 6, wherein the second to fourth optical axis converting mirrors comprise:
two reflective mirrors that convert the optical axis of the excitation light or the fluorescent light; and
a dichroic mirror that converts one of the axes of the excitation light and the fluorescent light without converting the other.

9. The device according to claim 8, wherein the second optical axis converting mirror is configured by a reflective mirror that converts by 90 degrees the optical axis of the excitation light transmitted by the transmissive portion of the light emitting plate,
wherein the third optical axis converting mirror is configured by a reflective mirror that converts by 90 degrees the optical axis of the fluorescent light converted by the first optical axis converting mirror, and
wherein the fourth optical axis converting mirror is configured by a dichroic mirror that converts by 90 degrees the optical axis of the fluorescent light converted by the third optical axis converting mirror without changing the optical axis of the excitation light converted by the second optical axis converting mirror.

10. The device according to claim 8, wherein the second optical axis converting mirror is configured by a reflective mirror that converts by 90 degrees the optical axis of the excitation light transmitted by the transmissive portion of the light emitting plate,
wherein the fourth optical axis converting mirror is configured by a reflective mirror that converts by 90 degrees the optical axis of the excitation light converted by the second optical axis converting mirror, and
wherein the third optical axis converting mirror is configured by a dichroic mirror that converts by 90 degrees the optical axis of the excitation light converted by the fourth optical axis converting mirror without changing the optical axis of the fluorescent light converted by the first optical axis converting mirror.

11. The device according to claim 6, wherein the second to fourth optical axis converting mirrors comprise three reflective mirrors that convert the optical axis of the excitation light.

12. The device according to claim 1, wherein the light emitting plate is formed to have a disc shape and provided with a drive unit that rotates the light emitting plate in a circumferential direction.

13. The device according to claim 1, wherein the optical device comprises a plurality of reflective mirrors and a dichroic mirror.

14. A projector comprising:
a light source device according to claim 1;
a display element;
a first optical system that guides light from the light source device to the display element;
a second optical system that projects an image emitted from the display element onto a screen; and
a projector controller that controls the light source device and the display element.

* * * * *